Oct. 21, 1930.    R. E. SCHULER    1,778,984
CABLE CLAMP
Filed Sept. 14, 1929
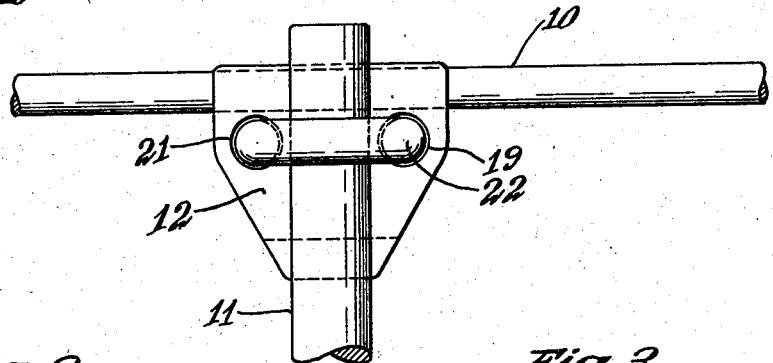
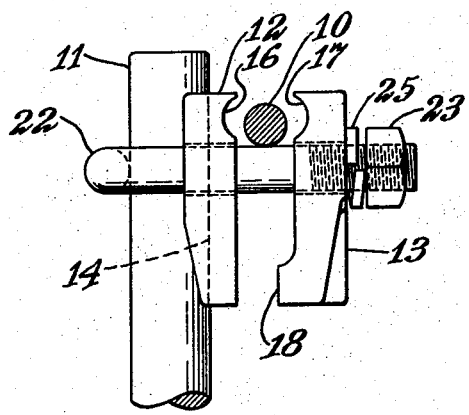
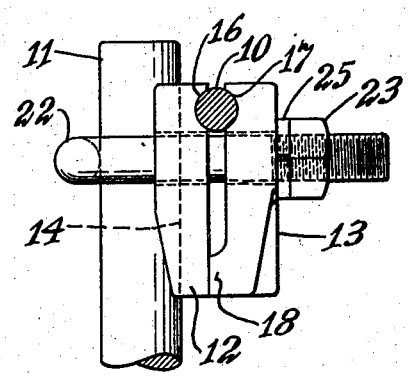
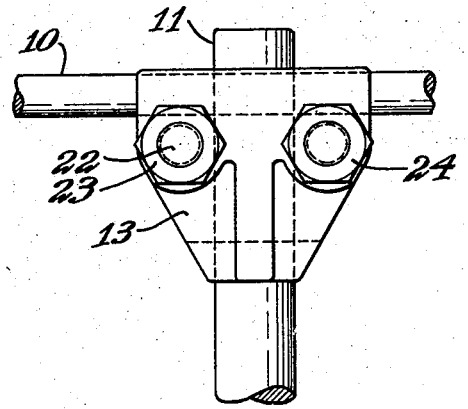
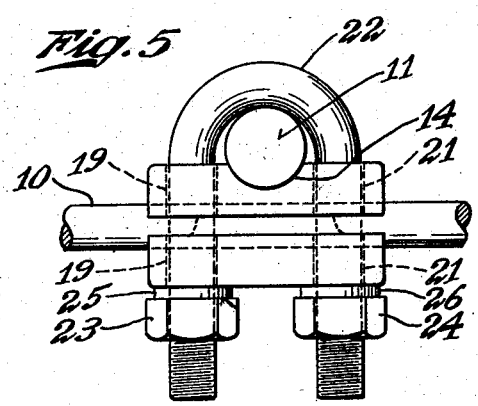
Inventor
Robert E. Schuler
By Johnston & Jennings Attorney.

Patented Oct. 21, 1930

1,778,984

UNITED STATES PATENT OFFICE

ROBERT E. SCHULER, OF BIRMINGHAM, ALABAMA, ASSIGNOR TO ANDERSON BRASS WORKS, INC., A CORPORATION OF ALABAMA

CABLE CLAMP

Application filed September 14, 1929. Serial No. 392,559.

My invention relates to clamps for uniting cables, such as electric conductors, and particularly to clamps for clamping cables together at right angles to each other, and has for its object the provision of a device of the character designated which shall be simple and economical of manufacture and one which may be readily applied and removed.

A further object of my invention is to provide a clamp for joining cables at right angles to each other in which an exceptionally good electrical contact is made with both cables without the use of solder and which may be readily applied and removed after the cables are in place without the necessity of threading either of the clamp members onto a cable.

Briefly, my invention comprises cooperating clamp members having longitudinal and transversely extending grooves for receiving the cables to be clamped and a U-bolt for drawing the clamp members together. The U bolt is so located with respect to the grooves that the clamp members are drawn into tight line contact with the cables thus insuring maximum conductivity through the clamp.

A device embodying features of my invention is illustrated in the accompanying drawings forming a part of this application in which Fig. 1 is a rear elevational view of the device with the cables clamped in place;

Fig. 2 is a side elevation with the U bolt nuts loosened showing the method of assembling or disassembling the device;

Fig. 3 is a view similar to Fig. 2 showing the U bolt nuts tightened up with the cables clamped;

Fig. 4 is a front elevation of the device; and

Fig. 5 is a plan view of the device.

Referring to the drawings for a better understanding of my invention, I show cables 10 and 11 extending at right angles to each other and which are to be secured together. My clamping device comprises a pair of cooperating clamp members 12 and 13 somewhat triangular in shape when viewed in front or rear elevation. The clamp member 12 is provided with a longitudinally extending groove 14 on the outer side thereof and extending centrally of the member. It is also provided with a transversely extending groove 16 on the inner side near the upper end thereof as seen in the drawing. The grooves 14 and 16 are adapted to receive the cables 11 and 10, respectively, which are thereby clamped together.

The clamp member 13 is similar in shape to the clamp member 12 but is provided with a transversely extending groove 17 opposite the groove 16 of the member 12. The lower end of the clamp member 13 is provided with a boss 18 adapted to bear against the lower end of the clamp member 12 when the parts are assembled.

Extending through both of the clamp members are aligned bolts holes 19 and 21, the bolt holes being located intermediate the ends of the clamp members and adjacent to the transversely extending grooves 16 and 17. The U bolt 22 extends through the holes 19 and 21 and embraces the cable 11. Fitting on the ends of the U bolt are nuts 23 and 24 which, when tightened down, are held against loosening by means of lock washers 25 and 26. The position of the U bolt with respect to the grooves 16 and 17 permits the cable 10 to be drawn into the grooves by tightening the nuts 23 and 24, without further effort to locate the cable 10 in proper clamping position.

As will be seen from a consideration of Figs. 2 and 3, when the parts are assembled with the cable 11 lying in the groove 14 and the cable 10 resting in the grooves 16 and 17, when the nuts on the U bolt are tightened up by the boss 18 acts as a fulcrum for the member 13 to draw the clamp members 12 and 13 into tight line contact with the cable 10. At the same time, the U bolt 22 draws the cable 11 into tight line engagement with the member 12. With the cables thus clamped it will be apparent that electrical current may flow through the short path defined by the member 12 and thus meets with a minimum of resistance. The position of the U bolt between the cable 10 and the boss 18 serves to hold the ends of the member 12 in tight engagement with the cable 11 at all times.

It will be understood that the term "cable"

in this specification, is intended to cover any equivalent members to be clamped together and is employed for simplicity of description. It will be apparent from the foregoing description that my improved clamp may be readily assembled without the necessity of threading the cables to be clamped through either of the clamp members. It will furthermore be apparent that a tight electrical contact over a considerable surface of both of the cables is obtained by my device so that it is not necessary after assembly, to minimize electrical resistance, to solder the clamp to the cables. It will furthermore be apparent that there is nothing about my improved clamp that depends upon a point contact either for conductivity or compression purposes.

While have shown my invention in but one form, it will be obvious to those skilled in the art that it is not so limited but is susceptible of various changes and modifications, without departing from the spirit thereof, and I desire therefore that only such limitations shall be placed thereupon as are imposed by the prior art, or as are specifically set forth in the appended claims.

What I claim is:

1. A cable clamp comprising a pair of cooperating clamp members one of which has a longitudinally extending groove on one side and a transversely extending groove on the other side near one end, the other clamp member having a transversely extending groove opposed to the transversely extending groove of the first mentioned member, a longitudinally extending reinforcing rib on the outer side of the other clamp member, a U bolt extending through both clamp members intermediate their ends and embracing one of the cables, nuts on both legs of the U bolt to draw the members toward each other and a boss on one of the clamp members bearing against the other clamp member near the end opposite the transversely extending grooves.

2. A cable clamp as set forth in claim 1 in which the transversely extending grooves are located adjacent to the U bolt whereby the cable to be clamped in said grooves is automatically positioned in the grooves when the clamp is tightened.

In testimony whereof I affix my signature.

ROBERT E. SCHULER.